Patented Nov. 22, 1949

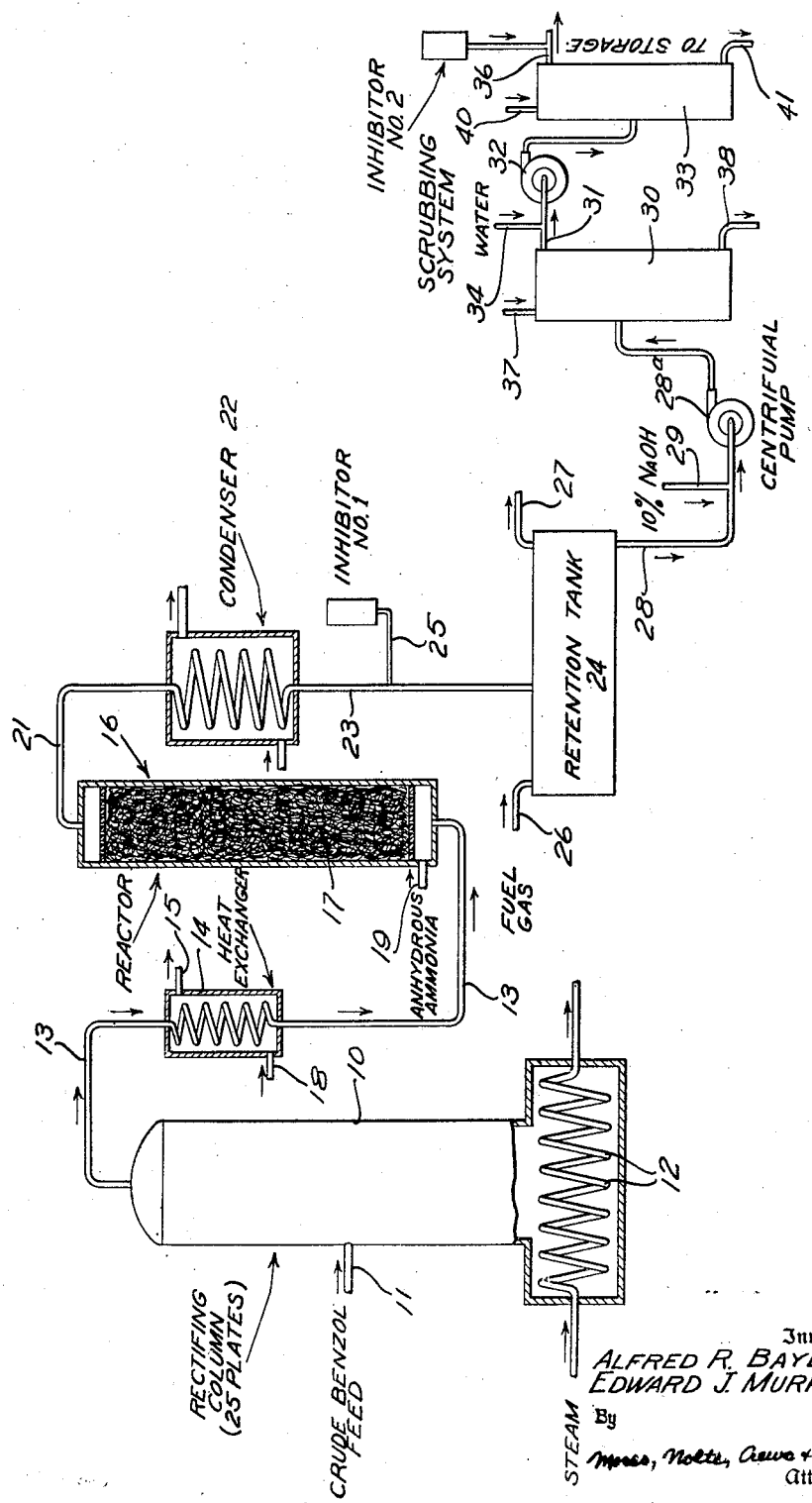

2,488,895

UNITED STATES PATENT OFFICE 2,488,895

METHOD OF SULFUR REMOVAL FROM BENZOL

Alfred R. Bayer, Chatham, N. J., and Edward J. Murphy, St. Albans, N. Y.

Application December 28, 1946, Serial No. 719,032

6 Claims. (Cl. 196—27)

Our present invention relates to an improved method of treating benzol to remove therefrom contained sulfur, especially that in the form of carbon disulfide, $CS_2$. One by-product of the destructive distillation of coal for the manufacture of coke is crude benzol which, when suitably refined, finds extensive use as a motor fuel. To be accepted, however, such benzol must have a sulfur content of not more than 0.4%. We have found that a substantial part of the sulfur which is present in the crude benzol is carbon disulfide, and that when this is removed the remaining sulfur, which is in the form principally of thiophenes, is within the tolerated limit.

For example, in one commercial plant with which we are familiar, the crude benzol fraction is subjected to fractional distillation to yield a fraction consisting principally of benzol destined as motor fuel, and a residue of heavier fractions consisting of toluol, xylol and other components termed crude solvent. The motor fuel fraction is removed from the distilling column in the neighborhood of the 25th plate and consists not only of the benzol vapors, but also those of the so-called forerunnings containing pentanes and light cyclic compounds and most of the carbon disulfide.

One proposed method of reducing the sulfur in the form of carbon disulfide is either to eliminate completely the forerunnings, much of which are valuable as motor fuel, or to subject them to fractionation for which an elaborate column is required.

It is the object of our present invention to remove the carbon disulfide by chemical means without the necessity of having to remove the entire forerunnings. To this end in our preferred embodiment we cause the carbon disulfide rich vapor from the distilling column, containing both the benzol vapors and those of the forerunnings, to undergo reaction with anhydrous ammonia vapor under suitable conditions, whereby to convert the $CS_2$ into a form in which it may be readily removed from the condensate. Our invention is based upon our discovery that under suitable conditions anhydrous ammonia undergoes a series of reactions with carbon disulfide to form intermediate ammonium dithiocarbamate and other compounds which, upon standing, yield end products removable from the condensate by washing with aqueous alkali solutions and water. We have further ascertained that for the reaction to be effective, it must be carried out initially at temperatures above 300° F., preferably from 350° to 400° F., and suitable time provided both in vapor and liquid phase for the reaction to go to the requisite degree of completion. This requires in the usual case that following the vapor phase reaction the condensate be given a suitable retention period, usually of the order of 18 to 24 hours, in order for the initial reaction products to yield a maximum of end products soluble in aqueous alkali solutions.

Our invention will be better understood by reference to the annexed drawing showing a schematic layout of the apparatus suitable for the carrying out of our improved process taken with the following detailed description.

In the drawing 10 denotes the rectifying column into which the crude benzol is fed through pipe 11, from a wash oil still not shown, heat being furnished in the column by means of steam fed through heating coil 12. The fraction containing the desired motor fuel is in our described embodiment taken above the 25th plate (which in general gives satisfactory results in meeting present day specifications of motor benzol from crudes of coke oven origin) through pipe 13 and passes therethrough to the heat exchanger 14, in which the temperature of such vapors is raised from about 175° to approximately 365° F., the heating fluid for this purpose entering through pipe 18, and leaving through pipe 15. From the heat exchanger the heated vapors pass to the reactor 16 which conveniently consists of an elongated chamber containing suitable filling material such as stainless steel wool 17, the effect of which is to slow up the velocity of the vapors to afford time for them to react with the anhydrous ammonia vapor which is admitted to the base of the vessel through pipe 19. After a period of time on the order of two seconds the vapors leave the top of the chamber through pipe 21 and are conveyed therethrough to condenser 22. From the condenser 22 the condensate passes through pipe 23 to the retention tank 24. On its way to tank 24 a gum inhibitor (No. 1) may be admitted to the stream of condensate through pipe 25. In tank 24 the condensate is held preferably at normal temperature, e. g. 70° F., for preferably from 18 to 24 hours, and protected by an atmosphere low in oxygen, as for example illuminating gas admitted through pipe 26 and leaving through pipe 27. Otherwise difficulty may be experienced from corrosion. After this period of time the condensate is passed through a further system of recovery, comprising pipe 28, centrifugal pump 28a in advance of which an aqueous solution, as for example a 10% sodium hydroxide solution, may be introduced through pipe 29. In the pump 28a the alkali solution, and the distillate are well mixed and in this condition pass to the separating tank 30, where the oil and water phases separate, the distillate being drawn off at the top through pipe 31 and pump 32 through a further separating tank 33, wash water being introduced into pipe 31 through pipe 34, and thoroughly mingled with the distillate in pump 32. Finally the oil phase is removed through pipe 36. At this point it is convenient to add gum inhibitor No. 2 in order to inhibit the formation of gum during all the storage periods. Inhibitor No. 1 will desirably be chosen so as to be resistant to the effect of ammonia and the sulfur compounds present in the distillate.

Preferably additional 10% alkali solution is admitted at the top of tank 30 through pipe 37 and is drawn off through pipe 38, at the bottom thereof. Similarly additional wash water may be added at the top of tank 33 through pipe 40 and withdrawn through pipe 41 at the bottom thereof. The foregoing apparatus is made up of individual pieces which are of conventional type and may be substituted by those of other types as will occur to those skilled in the art.

The effect of vapor temperature in the reaction chamber 16 is best seen in the following table:

[Total standard retention period: 18 hours; average anhydrous ammonia rate: 1.6 times theoretical requirement]

| Reactor Vapor Temperature | Per Cent Total Sulfur | | Per Cent Reduction, Total Sulfur |
|---|---|---|---|
| | Unprocessed Benzol | Processed Benzol | |
| 180° F | 0.48 | 0.44 | 8 |
| 250° F | 0.51 | 0.44 | 14 |
| 300° F | 0.51 | 0.40 | 22 |
| 365° F | 0.47 | 0.33 | 30 |
| 400° F | 0.47 | 0.32 | 32 |
| 425° F | 0.48 | 0.38 | 21 |
| 470° F | 0.46 | 0.38 | 17 |

It will be noted that the higher the temperature the more effective is the ammonia treatment, at least until the temperature 400° F. is reached. Beyond this temperature, anhydrous ammonia dissociation and equilibrium conditions tend to lessen the efficiency of the process. The amount of anhydrous ammonia used may be within 1.5 to 210 times that theoretically needed for complete reaction with all the carbon disulfide present in the benzol vapors. Thus a motor benzol of 0.18% total sulfur as carbon disulfide would require 0.33–0.44 oz. anhydrous ammonia per gallon of processed motor benzol. It is also true that within limits the higher the temperature the less time is needed for complete reaction in the retention tank.

The reactions involved in our improved method are complex, but the essential ones are believed to be as follows:

1. The initial reaction in vapor phase is mostly to form ammonium dithiocarbamate, $NH_2CS_2NH_4$.

2. In the retention tank the ammonium dithiocarbamate reacts to form ammonium thiocyanate and hydrogen sulfide, i. e.

$$NH_2CS_2NH_4 = NH_4SCN + H_2S$$

3. A portion of carbon disulfide may also react with the ammonia to form ammonium thiocyanate directly and ammonium sulfide in accordance with reaction $CS_2 + 4NH_3 = NH_4SCN + (NH_4)_2S$.

4. Further in the retention period some of the hydrogen sulfide is converted to elementary sulfur, and the ammonium sulfide reacts with the sulfur thus formed to give complex ammonium sulfides. It is important to note that the initially formed dithiocarbamate is not easily removed by washing, whereas the end products, i. e. the ammonium thiocyanate, ammonium sulfide and polysulfides are readily removable in alkaline washes. Likewise the excess ammonia is removed as ammonium hydroxide.

While we have called for ammonia in anhydrous form, the presence of some moisture is not precluded, but such moisture as is present diminishes the efficiency of the reaction, whereby greater quantities of ammonia are required.

Furthermore when operating at the higher vapor phase reaction temperatures, it is possible to omit the retention period for the requisite completion of the liquid phase reactions with some loss of efficiency resulting in greater consumption of ammonia. However, when operating with lower sulfur containing crude distillates, this loss of efficiency may be tolerated.

It will be further understood that our improved method is not limited to any specific type of benzol recovery plant, but is useful whenever it is desired to remove carbon disulfide from benzol however produced.

We claim:

1. In the purification of benzol to remove $CS_2$ therefrom the method which consists in treating the vapors of crude benzol in which the $CS_2$ is contained with substantially anhydrous ammonia in a temperature range of from 300° F. to not substantially in excess of 400° F., passing said treated vapors through a reaction zone, condensing the vapors and holding the condensate for a time period promoting substantial conversion of the sulfur containing products of the vapor phase reaction into products soluble in aqueous alkali and then separating said end products from the condensate.

2. The method according to claim 1 in which the anhydrous ammonia is caused to react with the contained $CS_2$ at a temperature range of 350° to 400° F.

3. The method according to claim 1 in which the condensate mentioned is held for a period of from 18 to 24 hours.

4. In the purification of crude benzol obtained from the destructive distillation of coal and containing fractions lighter and heavier than benzol to yield a purified motor fuel containing benzol and lighter fractions, the method which consists in subjecting said crude benzol to distillation, fractioning the vapors to yield a fraction consisting of benzol and fractions lighter than benzol, passing such vapor fractions through a reaction zone, there maintaining the temperature of the vapors in the range above 300° F. but not substantially above 400° F., introducing into said zone anhydrous ammonia in quantities sufficient to react with the vapor of carbon disulfide present, condensing such vapors and holding the condensate for a time period to promote the conversion of the sulfur containing products of the vapor phase reaction into products soluble in aqueous alkali and water and then separating said end products from the condensate to yield a substantially carbon disulfide free distillate.

5. A method according to claim 4 including the step of separating said end products by treatment of the condensate with aqueous alkali and water.

6. In the purification of benzol to remove $CS_2$ therefrom, the method which consists in treating the vapors of crude benzol in which the $CS_2$ is contained, with substantially anhydrous ammonia in the temperature range of 350 to 400° F., passing said treated vapors through a reaction zone, condensing the vapors and holding the condensate for a time period of from 18 to 24 hours to promote substantial conversion of the sulfur containing products of the vapor phase reaction into products soluble in aqueous alkali and then separating said end products from the condensate.

ALFRED R. BAYER.
EDWARD J. MURPHY.

REFERENCES CITED

The following references are of record in the file of this patent:

UNITED STATES PATENTS

| Number | Name | Date |
|---|---|---|
| 1,779,944 | Lawton | Oct. 28, 1930 |
| 2,418,047 | Parkes et al. | Mar. 25, 1947 |

FOREIGN PATENTS

| Number | Country | Date |
|---|---|---|
| 108,019 | Great Britain | July 17, 1917 |
| 425,938 | Great Britain | Mar. 25, 1935 |
| 435,965 | Great Britain | Oct. 2, 1935 |
| 13,210 | Australia | Jan. 17, 1935 |

OTHER REFERENCES

Mellor, "Inorganic and Theoretical Chem.," vol. VIII (1928), page 153.